United States Patent
Kirshenbaum (10) Patent No.: US 7,240,039 B2
(45) Date of Patent: Jul. 3, 2007

(54) SYSTEM AND METHOD FOR COMBINING VALUATIONS OF MULTIPLE EVALUATORS

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 509 days.

(21) Appl. No.: 10/695,707

(22) Filed: Oct. 29, 2003

(65) Prior Publication Data

US 2005/0097067 A1 May 5, 2005

(51) Int. Cl.
*G06F 17/00* (2006.01)
*G06N 5/00* (2006.01)
*G06N 5/02* (2006.01)

(52) U.S. Cl. .............................. 706/46; 706/45; 706/47
(58) Field of Classification Search ............ 706/45–47; 705/2–10
See application file for complete search history.

(56) References Cited

U.S. PATENT DOCUMENTS

| | | | | |
|---|---|---|---|---|
| 5,371,673 A | * | 12/1994 | Fan | 704/1 |
| 5,852,819 A | * | 12/1998 | Beller | 707/1 |
| 6,012,051 A | * | 1/2000 | Sammon et al. | 706/52 |
| 6,018,722 A | * | 1/2000 | Ray et al. | 705/36 R |
| 6,081,786 A | * | 6/2000 | Barry et al. | 705/3 |
| 6,110,214 A | * | 8/2000 | Klimasauskas | 703/2 |
| 6,141,653 A | * | 10/2000 | Conklin et al. | 705/80 |
| 6,188,988 B1 | * | 2/2001 | Barry et al. | 705/3 |
| 6,260,033 B1 | * | 7/2001 | Tatsuoka | 706/45 |
| 6,301,571 B1 | * | 10/2001 | Tatsuoka | 706/45 |
| 6,519,571 B1 | * | 2/2003 | Guheen et al. | 705/14 |
| 6,536,037 B1 | * | 3/2003 | Guheen et al. | 717/151 |
| 6,581,048 B1 | * | 6/2003 | Werbos | 706/23 |
| 6,611,822 B1 | * | 8/2003 | Beams et al. | 706/11 |
| 6,615,166 B1 | * | 9/2003 | Guheen et al. | 703/27 |
| 7,024,399 B2 | * | 4/2006 | Sumner et al. | 706/45 |
| 7,107,253 B1 | * | 9/2006 | Sumner et al. | 706/45 |

OTHER PUBLICATIONS

Measuring disagreement in groups facing limited choice problems Whitworth, B.; Felton, R.; System Sciences, 1998., Proceedings of the Thirty-First Hawaii International Conference on vol. 1, Jan. 6-9, 1998 pp. 351-359 vol. 1.*

Simulation of working procedures in a distribution centre Santos, M.; de la Cruz, J.M.; Emerging Technologies and Factory Automation, 2003. Proceedings. ETFA '03. IEEE Conference vol. 1, Sep. 16-19, 2003 pp. 39-46 vol. 1 Digital Object Identifier 10.1109/ETFA.2003.1247685.*

Multi-sample data-dependent fusion of sorted score sequences for biometric verification Ming-Cheung Cheung; Man-Wai Mak; Sun-Yuan Kung; Acoustics, Speech, and Signal Processing, 2004. Proceedings. (ICASSP '04). IEEE International Conference on vol. 5, May 17-21, 2004 pp. V-681-684 vol. 5 Digital Object Identifier 10.1109/ICASSP.2004.1327202.*

(Continued)

*Primary Examiner*—Anthony Knight
*Assistant Examiner*—Michael B. Holmes (57) ABSTRACT

Disclosed herein are systems and methods for combining valuations of multiple evaluators. One disclosed method embodiment comprises (for each evaluator): sorting the choices into an order indicative of preference; determining interval sizes between adjacent choices; obtaining a rank for each interval size; and using interval size ranks to determine an evaluator score for each choice. The evaluator scores can be combined to determine an overall score for each choice.

30 Claims, 5 Drawing Sheets

OTHER PUBLICATIONS

Objective evaluation of subjective decisions Siegel, M.; Huadong Wu; Soft Computing Techniques in Instrumentation, Measurement and Related Applications, 2003. SCIMA 2003. IEEE International Workshop on May 17, 2003 pp. 14-18 Digital Object Identifier 10.1109/SCIMA.2003.1215924.*

An analysis of evaluation information: a method based on SVD & dimensionality reduction model Huan Qi; Yunfeng Liu; Xiaoping Wang; Henghui Xiao; Shanshan Wang; Information Acquisition, 2004. Proceedings. International Conference on Jun. 21-25, 2004 pp. 40-45 Digital Object Identifier 10.1109/ICIA.2004.1373317.*

What kind of images do I need? What is the delay to obtain them? Houzelle, S.; Bellemain, P.; Amalric, J.; Herry, P.; Geoscience and Remote Sensing Symposium, 1996. IGARSS '96. 'Remote Sensing for a Sustainable Future.', International vol. 1, May 27-31, 1996 pp. 823-825 vol. 1 Digital Object Identifier 10.1109/IGARSS.1996.516487.*

* cited by examiner

|  | E1 | E2 | E3 | E4 |  |
|---|---|---|---|---|---|
| CLASS/ | C3 | C1 | C1 | C3 | MORE PREFERRED |
| / |  |  |  |  | ↕ 602 |
| CLASS/ | C1 | C4 | C2 | C2 | 604 |
| / |  |  |  |  |  |
| CLASS/ | C2 | C3 | C3 | C4 |  |
| / |  |  |  |  | LESS PREFERRED |
| CLASS/ | C4 | C2 | C4 | C1 |  |

Fig. 6b

|  | E1 | E2 | E3 | E4 |
|---|---|---|---|---|
| CLASS/ | C3 | C1 | C1 | C3 |
| INTERVAL/ | 2 | 5 | 3 | 2 |
| CLASS/ | C1 | C4 | C2 | C2 |
| INTERVAL/ | 20 | 7 | 10 | 1 |
| CLASS/ | C2 | C3 | C3 | C4 |
| INTERVAL/ | 77 | 1 | 385 | 4 |
| CLASS/ | C4 | C2 | C4 | C1 |

Fig. 6c

|  | E1 |  | E2 |  | E3 |  | E4 |  |
|---|---|---|---|---|---|---|---|---|
| CLASS/ | C3 |  | C1 |  | C1 |  | C3 |  |
| INTERVAL/RANK | 2 | 1 | 5 | 2 | 3 | 1 | 2 | 2 |
| CLASS/ | C1 |  | C4 |  | C2 |  | C2 |  |
| INTERVAL/RANK | 20 | 2 | 7 | 3 | 10 | 2 | 1 | 1 |
| CLASS/ | C2 |  | C3 |  | C3 |  | C4 |  |
| INTERVAL/RANK | 77 | 3 | 1 | 1 | 385 | 3 | 4 | 3 |
| CLASS/ | C4 |  | C2 |  | C4 |  | C1 |  |

Fig. 6d

|  | E1 |  | E2 |  | E3 |  | E4 |  |
|---|---|---|---|---|---|---|---|---|
| CLASS/SCORE | C3 | 0 | C1 | 0 | C1 | 0 | C3 | 0 |
| INTERVAL/RANK | 2 | 1 | 5 | 2 | 3 | 1 | 2 | 2 |
| CLASS/SCORE | C1 | 1 | C4 | 2 | C2 | 1 | C2 | 2 |
| INTERVAL/RANK | 20 | 2 | 7 | 3 | 10 | 2 | 1 | 1 |
| CLASS/SCORE | C2 | 3 | C3 | 5 | C3 | 3 | C4 | 3 |
| INTERVAL/RANK | 77 | 3 | 1 | 1 | 385 | 3 | 4 | 3 |
| CLASS/SCORE | C4 | 6 | C2 | 6 | C4 | 6 | C1 | 6 |

Fig. 8

|    | E1 | E2 | E3 | E4 |
|----|----|----|----|----|
| C1 | 5  | 4  | 2  | 5  |
| C2 | 5  | 17 | 5  | 0  |
| C3 | 3  | 8  | 5  | -2 |
| C4 | 12 | 6  | 8  | 1  |

Fig. 9a

|                | E1    |   | E2 |     | E3    |     | E4 |   |
|----------------|-------|---|----|-----|-------|-----|----|---|
| CLASS/SCORE    | C3    | 0 | C1 | 0   | C1    | 0   | C3 | 0 |
| INTERVAL/RANK  | 2     | 1 | 2  | 1.5 | 3     | 1.5 | 2  | 2 |
| CLASS/SCORE    | C1,C2 | 1 | C4 | 1.5 | C2,C3 | 1.5 | C2 | 2 |
| INTERVAL/RANK  | 7     | 2 | 2  | 1.5 | 3     | 1.5 | 1  | 1 |
| CLASS/SCORE    | C4    | 3 | C3 | 3   | C4    | 3   | C4 | 3 |
| INTERVAL/RANK  |       |   | 9  | 3   |       |     | 4  | 3 |
| CLASS/SCORE    |       |   | C2 | 6   |       |     | C1 | 6 |

Fig. 9b

|                | E1 |   | E2 |     | E3 |     | E4 |   |
|----------------|----|---|----|-----|----|-----|----|---|
| CHOICE/SCORE   | C3 | 0 | C1 | 0   | C1 | 0   | C3 | 0 |
| INTERVAL/RANK  | 2  | 1 | 2  | 1.5 | 3  | 1.5 | 2  | 2 |
| CHOICE/SCORE   | C1 | 1 | C4 | 1.5 | C2 | 1.5 | C2 | 2 |
| INTERVAL/RANK  | 0  | 0 | 2  | 1.5 | 0  | 0   | 1  | 1 |
| CHOICE/SCORE   | C2 | 1 | C3 | 3   | C3 | 1.5 | C4 | 3 |
| INTERVAL/RANK  | 7  | 2 | 9  | 3   | 3  | 1.5 | 4  | 3 |
| CHOICE/SCORE   | C4 | 3 | C2 | 6   | C4 | 3   | C1 | 6 |

SYSTEM AND METHOD FOR COMBINING VALUATIONS OF MULTIPLE EVALUATORS

BACKGROUND

Decisions can be made in any number of ways. However, decision making methods that permit consideration of many choices are generally recognized as desirable, at least partly because the ability to consider many choices at least potentially improves the outcome's suitability. Decision making methods that rely on input from multiple sources are also generally recognized as more desirable. The use of multiple sources may effectively increase the amount of information and/or may enable the formation of a consensus view. Unfortunately, as the number of choices and the number of sources increases, the outcome becomes less clear and is often dependent on the particular method employed for decision making. In such circumstances, the decision making method should be chosen with care.

In selecting a decision making method, a system designer may give due consideration to the distinguishing characteristics of different decision making methods. For example, certain decision making methods may require that input sources use a uniform evaluation scale, while others may need only a relative ranking of choices from each source. The uniform scale requirement may undesirably cause a change in a source's measure of the similarity or dissimilarity of different choices relative to other sources, whereas the relative ranking approach nearly eliminates the similarity information altogether.

In many cases, it would be desirable to employ a decision making method that preserves the sources' indications of choice similarity or dissimilarity as the information from the sources is combined to determine an outcome. Such a method would preferably not require that the input sources employ a uniform scale. The literature appears to be devoid of such a decision making method.

BRIEF SUMMARY

Accordingly, there is disclosed herein systems and methods for combining valuations of multiple evaluators. One disclosed method embodiment comprises (for each evaluator): sorting the choices into an order indicative of preference; determining interval sizes between adjacent choices; obtaining a rank for each interval size; and using interval size ranks to determine an evaluator score for each choice. The evaluator scores can be combined to determine an overall score for each choice.

BRIEF DESCRIPTION OF THE DRAWINGS

For a detailed description of various invention embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The overall context of the disclosed systems and methods is that of answering a question, where the answer is to be selected from a known set of at least three possible answers, herein referred to as "choices". The choices are discrete and need not be ordered within the set. The context further includes two or more evaluators each of which is able to associate with each choice a value representing an opinion of that choice's suitability as an answer to the question. (In some embodiments, evaluators may be allowed to evaluate fewer than all of the choices.) The disclosed methods and systems make no assumption about the range of values given by each evaluator or about the interpretation of the particular values assigned. One assumption that is reflected by the disclosed methods and systems is that the values are arranged to indicate a preference, i.e., that relatively higher or relatively lower values are considered relatively better by the evaluator.

The disclosed methods and systems take the values assigned by the individual evaluators and combine them using a novel method to produce a consensus score associated with each choice. The score can be used to select a single choice as a most suitable answer for the question, to select a choice from any given subset as a most suitable answer for the question, to select a number of choices that are "top answers" to the question (where the number is fixed or determined based on consensus scores), to compare two choices, or to rank some or all of the choices. The disclosed systems and methods may be used as evaluators in a larger context, e.g., when it is desired to assign a score to each choice.

As a special case, the scores computed by the disclosed systems and methods may be used as though produced by an evaluator in a further instance of the disclosed methods and systems. Examples of such a special case might include hierarchical ranking problems such as ranking a company's products in each of several geographic regions (based on revenue, profit, rate of return) and then combining the regional ranking scores to determine an overall score for each of the products. Another example of such a special case might include questions with a temporal component, so that consensus scores computed for the last seven days are combined to determine overall scores for the week.

The disclosed systems and methods may be applied in a classification context. In the classification context, the evaluators may take the form of classifiers, that is, they may be meters, software routines, or other measurement sources that provide some indication of the likelihood, probability, or opinion that a given item belongs in each of several different classes. In one specific example, a web server may include a number of routines that attempt to classify a web site visitor as, e.g., technically savvy, normal, or technically naïve. A decision making method that combines the opinions of different classification routines may provide significantly improved accuracy and a corresponding improvement in the ability to cater to a customer's needs. Other specific applications that may fall in the classification context include: selecting alternatives for a device user, evaluating a device user, assessing an environment in which a device is employed, judging competitions.

The disclosed systems and methods may be applied in a multi-criterion optimization context. In this context, the evaluators may take the form of objective measures of different choices or configurations for a system. In one specific example, a power distribution system may include measures of efficiency, profitability, reliability, and versatility of different system configurations. A decision making method that combines these measures to determine a consensus configuration may provide and maintain improved system configurations. Other specific applications may include revenue predictions, gambling, and system modeling.

Another specific example of the multi-criterion optimization context is a system using an evolutionary-based process to determine a solution. In this context, the disclosed methods may be used to select from a population of candidate solutions those candidate solutions that are allowed to "reproduce". The disclosed methods allow the selection to be biased in favor of those candidate solutions having a better consensus scores based on evaluators representing various objective measures of performance and complexity.

The disclosed systems and methods may be applied in a feature selection context. In this context the evaluators may take the form of estimates of the ability of the object features to correctly categorize members of each class. In one specific example, a designer of a document classification system is seeking a fixed-size set of words that may be used to classify documents. The designer may determine a set of correlation measurement between document classes and words in each of the documents, and then may apply the disclosed methods to determine a consensus across all document classes as to the membership for the fixed-size set of words. Other specific applications may include investment portfolio management.

The foregoing discussion of potential applications of the disclosed systems and methods is meant to be illustrative and not limiting. Many other applications may also prove suitable.

Figure 1:
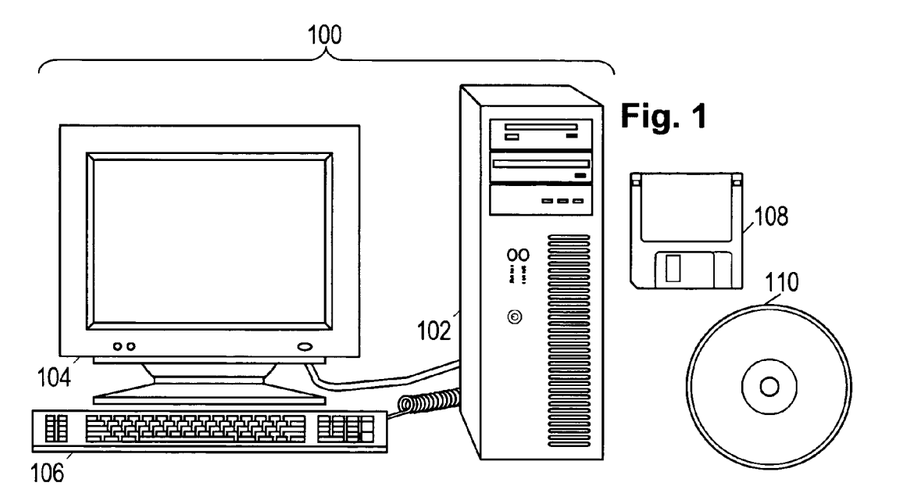
FIG. 1 is an external view of an illustrative decision making system in accordance with certain embodiments of the present invention.

FIG. 1 shows an illustrative system for combining valuations of multiple evaluators (herein termed a "decision making system"). FIG. 1 shows the illustrative decision making system in the form of a desktop computer 100, although any electronic device configured with some amount of computing power may be configured to carry out the methods disclosed herein. Among other things, portable computers, personal digital assistants (PDAs), cable or satellite control boxes, cameras, telephones, fax machines, kitchen appliances, engine control computers, security systems, radios, speakers, network switches, and electronic voting systems may be configured to carry out the disclosed decision making methods.

Desktop computer 100 typically includes a chassis 102, a display 104, and an input device 106. Chassis 102 typically includes a processor, memory, and information storage devices. One or more of the information storage devices may store programs and data on removable storage media such as a floppy disk 108 or a compact disc 110. Chassis 102 is coupled to display 104 and input device 106 to interact with a user. Display 104 and input device 106 may together operate as a user interface. Display 104 is shown as a video monitor, but may take many alternative forms including a printer, a speaker, a buzzer, a light, a gauge, or other means for communicating information to a user. Input device is shown as a keyboard, but may similarly take many alternative forms including a button, a mouse, a keypad, a switch, a dial, a motion sensor, a camera, a microphone or other means for receiving information from a user. Both the display 104 and the input device 106 may be integrated into the chassis 102.

Figure 2:
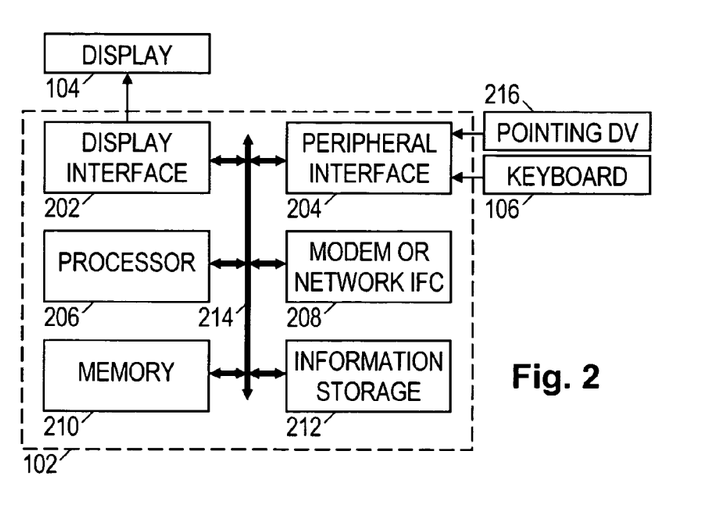
FIG. 2 is a functional block diagram of an illustrative decision making system in accordance with certain embodiments of the present invention.

FIG. 2 shows a simplified functional block diagram of the desktop computer 100. Chassis 102 may include a display interface 202, a peripheral interface 204, a processor 206, a modem or other suitable network interface 208, a memory 210, an information storage device 212, and a bus 214. Computer 100 may be a bus-based system, with bus 214 interconnecting the other elements and carrying communications between them. Display interface 202 may take the form of a video card or other suitable display interface that accepts information from bus 214 and transforms it into a form suitable for display 104. Conversely, peripheral interface 204 may accept signals from keyboard 106 and other input devices such as a pointing device 216, and transform them into a form suitable for communication on bus 214.

Processor 206 gathers information from other system elements, including input data from peripheral interface 204, program instructions and other data from memory 210, information storage device 212, or from a remote location via network interface 208. Processor 206 carries out the program instructions and processes the data accordingly. The program instructions may further configure the processor 206 to send data to other system elements, including information for the user which may be communicated via display interface 202 and display 104.

Network interface 208 enables the processor 206 to communicate with remote systems via a network. Memory 210 may serve as a low-latency temporary store of information for processor 206, and information storage device 212 may serve as a long term (but generally high-latency) store of information.

Processor 206, and hence computer 100 as a whole, typically operates in accordance with one or more programs stored on information storage device 212. Processor 206 may copy portions of the programs into memory 210 for faster access, and may switch between programs or carry out additional programs in response to user actuation of the input device. The additional programs may be retrieved from information storage device 212 or may be retrieved from remote locations via network interface 208. One or more of these programs may configure the computer 100 to carry out at least one of the decision making methods disclosed herein.

The programs executed by computer 100 may include one or more evaluators. Alternatively, computer 100 may be configured to retrieve valuations from one or more external evaluators. Evaluators, as that term is used herein, are sources of valuations for the various choices. Depending on the particular application, the evaluators may be users (e.g., judges, voters, customers, employees, planners, investors), sensors (e.g., timers, scales, meters, transducers, comparators, counters), algorithmic routines (e.g., expert systems, software models, decision trees, belief networks, neural networks, statistical measures), or mixtures thereof. Advantageously, various embodiments of the disclosed method do not require that each evaluator employ the same evaluation scale.

Evaluators based on algorithmic routines may be non-deterministically trained. Examples of non-deterministically-trained evaluators include those that are based on machine learning, i.e., those evaluators that have been trained as the device is actually used, or otherwise trained on different sets of training data. When evolutionary training methods, population-based training methods, or related training methods are employed, multiple evaluators typically result. Where non-deterministically-trained evaluators are used, multiple differently-trained versions of the same evaluator may be included in the set of evaluators.

Figure 3:
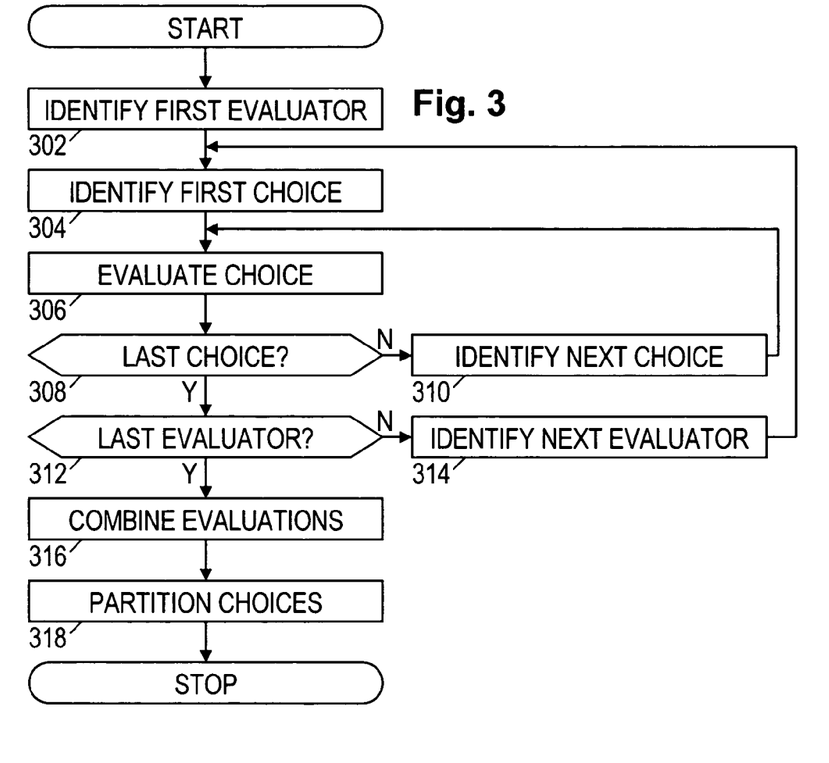
FIG. 3 is a flowchart of an illustrative decision making method in accordance with certain embodiments of the present invention.

FIG. 3 shows a flowchart of illustrative decision making method embodiments. In block 302, the decision making system (DMS) identifies a first evaluator. The DMS may have a list of evaluators through which it moves systematically, in which case the first evaluator may simply be the first on the list. In block 304, the DMS identifies a first choice. This identification may similarly be done with the aid of a list of choices. The lists of evaluators and choices may be provided by a user, coded into a program, or obtained by any other suitable method.

In block 306, the DMS determines the evaluator's valuation of the choice. This determination may take many forms, including executing an evaluator routine in the DMS, soliciting a valuation from an external evaluator, or retrieving the valuation from a pre-existing data file. In some embodiments, the DMS may be configured to apply additional processing to convert a received valuation into a more suitable valuation. For example, a given evaluator may generate valuations on a highly nonlinear scale (e.g., an exponential scale), and the DMS may be configured to take a logarithm of the received value to "linearize" the valuation. Also, in some embodiments the DMS may be configured to determine a default value whenever an evaluator fails to provide a valuation. The default value may be an extreme value that indicates extreme unsuitability of the choice, e.g., plus or minus infinity (or some digital equivalent thereof) depending on whether the evaluator's preference scale is decreasing or increasing, respectively.

In block 308, the DMS determines whether the evaluator's valuation of each choice has been determined. If not, the DMS identifies the next choice in block 310 and returns to block 306. Otherwise, in block 312, the DMS determines whether valuations have been determined for each evaluator. If valuations need to be determined for other evaluators, the DMS identifies the next evaluator in block 314 and returns to block 304.

Once each evaluator's valuations for each choice have been determined, the DMS combines the valuations in block 316 to determine a score for each choice. In block 318, the DMS may partition the choices, i.e., select a choice or divide the available choices into a given number of groups according to score. The partitioning operation may be customized as appropriate for the given application. Application examples are described further below.

Figure 4:
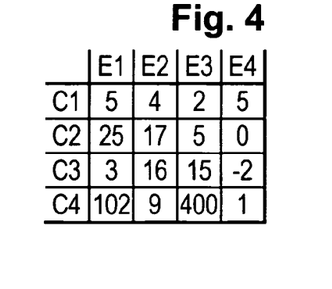
FIG. 4 is a table of evaluation data for an illustrative example.

An illustrative embodiment of combining block 316 shown in FIG. 5, and is discussed with reference to a numeric example. FIG. 4 shows, in table form, a set of valuations that might be determined by four evaluators (E1-E4) for four choices (C1-C4) as the DMS transitions to block 316. For simplicity, the valuations are shown as integers, but no such requirement is imposed. Further, it is assumed in the following discussion that lower valuations are preferable to high valuations, but accommodating the convention of each evaluator is straightforward.

Figures 5, 7:
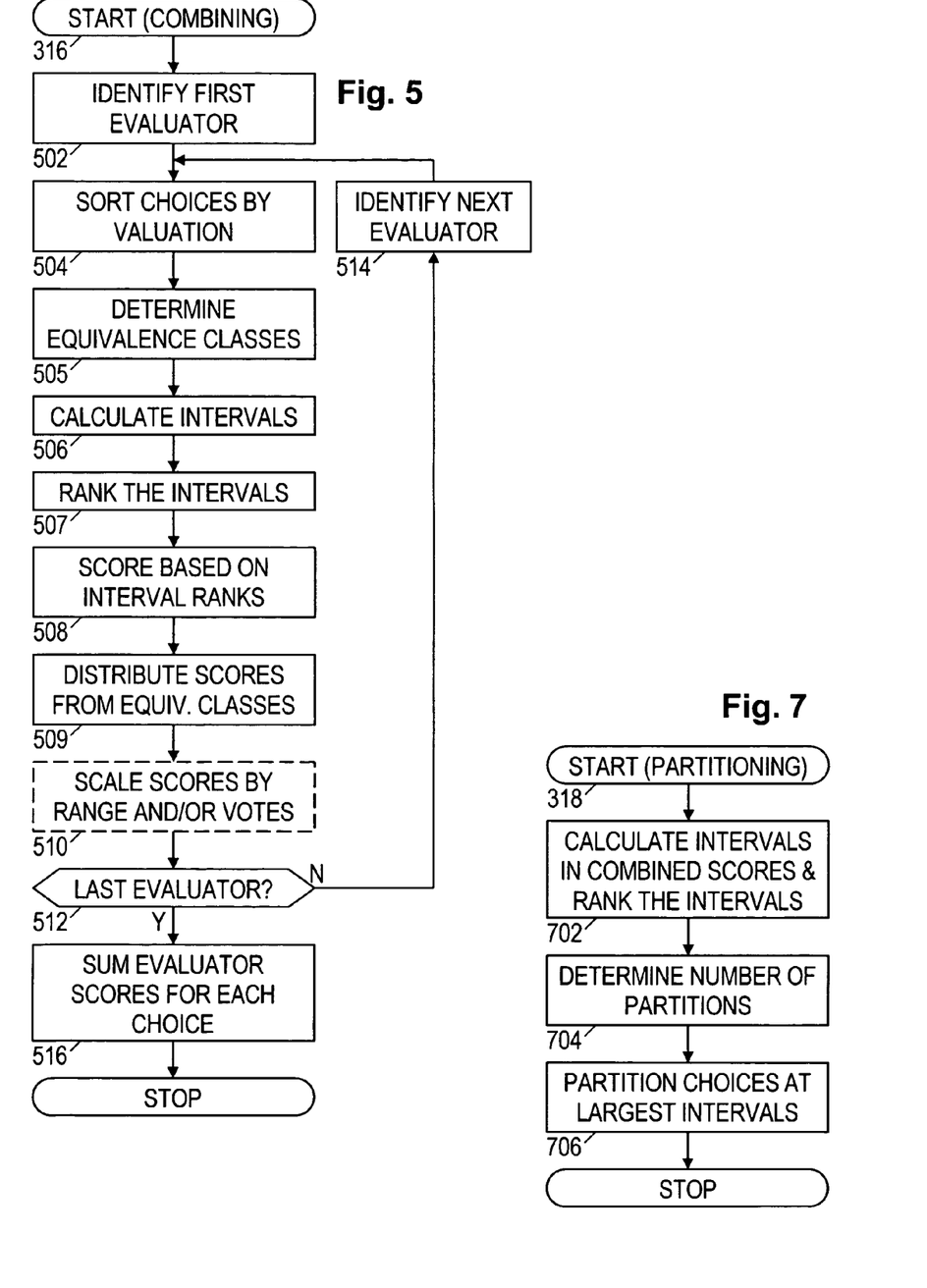
FIG. 5 is a flowchart of a "combining" portion of the illustrative decision making method in accordance with certain embodiments of the present invention.
FIG. 7 is a flowchart of a "partitioning" portion of the illustrative decision making method in accordance with certain embodiments of the present invention.

Beginning then with block 502 in FIG. 5, the DMS iterates through the set of evaluators, carrying out the operations represented by blocks 504, 505, 506, 507, 508, 509, 510, 512, and 514. These blocks form a loop bounded by blocks 502 and 514. In block 502, the DMS identifies a first evaluator, and in block 514 the DMS identifies a subsequent evaluator until in block 512, the DMS determines that the loop operations have been performed for each evaluator.

In block 504, the DMS sorts the choices by valuation in order from most preferred to least preferred. Thus, referring momentarily to FIG. 4, the valuations of evaluator E1 may result in the choices being sorted in order C3-C1-C2-C4.

In block 505, the DMS compares the valuations to determine equivalence classes. Equivalence classes are groups of choices having valuations that are substantially equal. Substantial equality is described further below with reference to FIGS. 8-9b. For the present example, choices are considered substantially equivalent only if their valuations are equal. Accordingly, a different equivalence class is determined for each choice.

Each equivalence class is assigned a valuation based on the valuation(s) of its member(s). In the case where members have the same valuation, this valuation may be used. If the members have different valuations, a class valuation may be obtained by, for example, taking the mean or median of the member's valuations. Other combination operators may also be used, including without limitation, the maximum valuation and the minimum valuation.

Figure 6A:
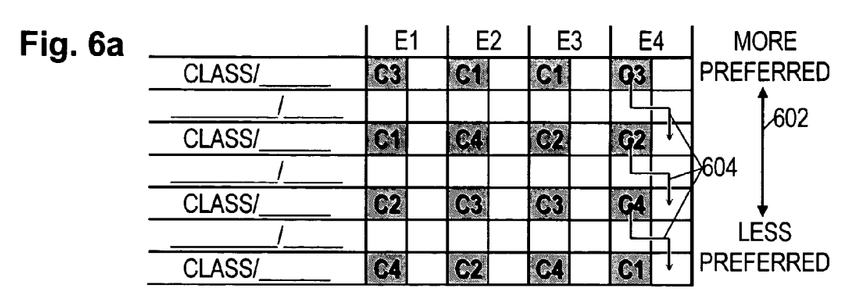
FIGS. 6a-6d show a sequence of tables for applying the illustrative decision making method to the example in accordance with certain embodiments of the present invention.
Figure 6B:
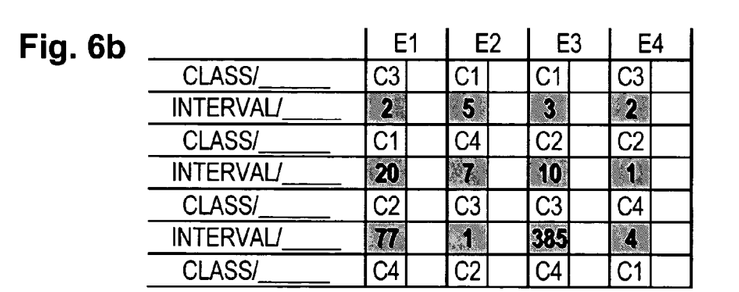
Figure 6C:
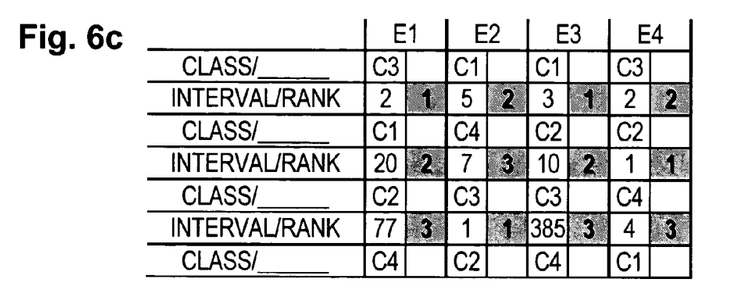
Figure 6D:
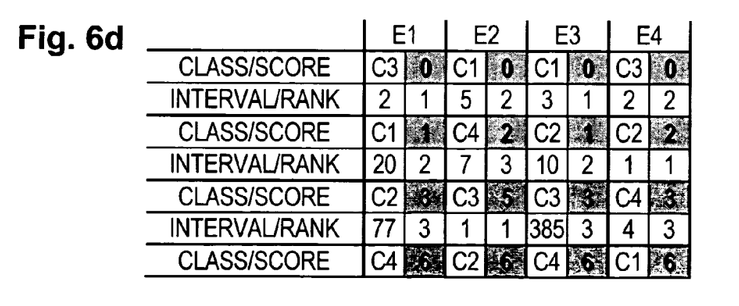

FIG. 6a shows the result of the block 504 and 505 operations for each evaluator. Equivalence classes are sorted in order for each evaluator. Arrow 602 shows the order of preference for the various classes. FIGS. 6b-6d show subsequent calculation results. For now, it is sufficient to note that the table of FIG. 6a is replicated in FIGS. 6b-6d, with the empty cells filled in turn as indicated by arrows 604.

In block 506, the DMS calculates intervals between adjacent classes. Again, referring momentarily to FIG. 4, the C3-C1 interval is |3−5|=2. The C1-C2 interval is |5−25|=20, and the C2-C4 interval is |25−102|=77. These intervals may be expressed as follows: C3-2-C1-20-C2-77-C4. FIG. 6b shows the result of the interval calculation for each evaluator.

In block 507, the DMS ranks the intervals between adjacent classes from smallest to largest. The C3-C1 interval (2) is smallest, followed by the C1-C2 interval (20), followed by the C2-C4 interval (77), thus these intervals are ranked 1, 2, and 3, respectively. These ranked intervals may be expressed as follows: C3-1-C1-2-C2-3-C4. FIG. 6c shows the result of the interval ranking for each evaluator.

In block 508, the DMS calculates a score for each class based on the interval ranks. In some embodiments, the score for the most preferred class is set at a predetermined value, and the score for each subsequent class is determined as a predetermined function of the score of the preceding class and the interval rank. (In some embodiments, different functions may be used to calculate the scores associated with different evaluators.) In equation form, the scores are calculated as follows:

$$S_1 = C$$

$$S_i = f(S_{i-1}, R_i), i = 2, 3, \ldots, n$$

where $S_i$ is the score of class i, where i ranges from 1 (most preferred) to n (least preferred), C is a predetermined constant, $R_i$ is the rank of the interval between class i and class i-1, and f(*) is a predetermined scoring function. (In at least some alternative embodiments, the index i may range from 1 (least preferred) to n (most preferred), without any adverse impact.) For ease of understanding, let us first consider the case where f(*) represents simple addition. That is, $$C = 0, \text{ and}$$

$$f(S_{i-1}, R_i) = S_{i-1} + R_i$$

In this case, the DMS in block 508 begins with zero for the most preferred class, and adds the rank of the intervals to determine the scores for other classes. Thus, for evaluator E1, the score for C3 (the most preferred class) is zero. The score for C1 is the rank of the C3-C1 interval added to the score for the C3 interval, 1+0=1. The score for C2 is the rank of the C1-C2 interval added to the score for C1, or 2+1=3. Finally, the score for C4 is the rank of the C2-C4 interval added to the score for C2, or 3+3=6. To aid in understanding the score calculation, consider the expression C3(0)-1-C1(1)-2-C2(3)-3-C4(6), where the scores are shown in parenthesis. FIG. 6d shows the result of this score calculation for each evaluator.

In block 509, the DMS assigns the score of each class to the choices that are members of that class. In other words, each choice takes on the score of its equivalence class. As will be illustrated further below, this operation takes on more significance when one or more of the classes has multiple members.

The scores calculated using the simple addition form of the scoring function will range from 0 (most preferred) to the sum of all the interval ranks (least preferred). The choices are distributed within this range in a manner that preserves the relative similarity/dissimilarity between choices as indicated by each evaluator. Thus, the order of the choices is preserved, and the choices regarded as most similar (as indicated by having the smallest interval) are scored most closely, whereas the choices regarded as least similar (as indicated by having the largest interval) are scored least closely.

In optional block 510, the scores may be scaled to distribute them across the same range. The purpose of this scaling operation would be to ensure that each evaluator's judgment of "best to worst" covers the same range.

Alternatively, or in addition, the scores for a given evaluator may be scaled by the sum of the scores for that evaluator. For example, with reference to FIG. 6d, the scores determined by evaluator E1 are 0, 1, 3, and 6, which sum to 10. Accordingly, each of these scores may be divided by 10. For comparison, the scores determined by evaluator E2 are 0, 2, 5, and 6, which sum to 13. Accordingly, each of these scores may be divided by 13. The purpose of this scaling operation would be to equalize the contributions of each evaluator in determining the overall score for each choice. Stated in another way, this scaling ensures that each evaluator has an equal amount of voting power that is cast in proportion to the evaluator's determination of the similarity or dissimilarity of the various choices.

Blocks 512 and 514 conclude the loop, causing the DMS to repeat the operations of blocks 505-510 for each evaluator in turn. Once the choice scoring has been completed for each evaluator, the DMS in block 516 combines the evaluators' scores for each choice to determine an overall, or "combined" score for each choice. This combining operation may be performed by simply summing the evaluators' scores for each choice. Alternatively, a weighted summation may be performed to give greater weight to certain evaluators' opinions. The weights may be determined in a context-specific manner. For example, certain evaluators may simply have relatively more importance than others, or certain evaluators may be historically more accurate, or certain evaluators may be more representative in some fashion. Other combination techniques may also be employed.

Upon completing the operation of block 516 (and hence completing the combining operation of block 316 in FIG. 3), the DMS may be thought of as a table, in which the first column lists the choices in order from most preferred (or most favorable) to least preferred (or least favorable), and in which the second column lists overall scores corresponding to the choices in the first column. For example, if optional block 510 is omitted, the DMS results for the valuations of FIG. 4 might be:

| Choice | Score |
|---|---|
| C1 | 7 |
| C3 | 8 |
| C2 | 12 |
| C4 | 15 |

In some embodiments, the disclosed method may conclude by presenting such a table to the user, or perhaps presenting or otherwise acting on only the most preferred choice. In other embodiments, further processing may be desired.

Returning for a moment to block 508, different embodiments of the DMS may employ different score-calculating functions $f(S_{i-1}, R_i)$. In certain applications, for example, it might be useful to employ a function that increases faster than a linear relation to exaggerate larger gaps. In other applications, the function might also or alternatively be bounded to keep score intervals from becoming too large. In yet other applications, the function might also or alternatively be based on observed statistical distributions of increments. Thus if the ranked intervals tend to cluster, the function might similarly cluster increments associated with the corresponding interval ranks.

FIG. 7 shows an illustrative embodiment of the partitioning operation of block 318 (in FIG. 3). In the embodiment of FIG. 7, the choices are partitioned into a specified number of groups. Considering the results of block 316 as an ordered table, the DMS in block 702 calculates intervals between the combined scores and ranks the intervals in order from largest to smallest. In block 704, the DMS determines the number of partitions N. This determination may be done in any number of ways, including requesting a number from the user, or determining the rank of the largest interval below a predetermined threshold, or simply using a predetermined number. In block 706, the DMS partitions the choices at the N-1 largest intervals, thereby producing N sets of one or more choices each. In some embodiments, the DMS may present the partitioned sets to a user in order from most preferred to least preferred, or may otherwise act on the partitioned sets of choices.

Figure 8:
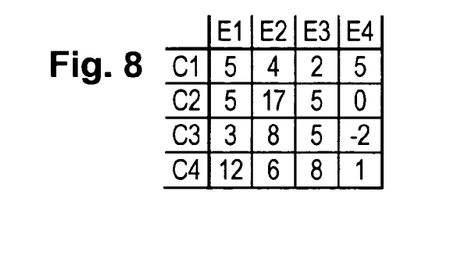
FIG. 8 is a table of evaluation data for a special-case example.

In considering the foregoing description, two special circumstances may occur to the reader. A first special circumstance may occur when a given evaluator values two or more choices as substantially equal. A second special circumstance may occur when two or more intervals between a given evaluator's valuations are ranked equally. To illustrate the handling of these special circumstances, FIG. 8 shows a table of evaluator valuations in which evaluator E1 values choices C1 and C2 equally, evaluator E2 values choices C1, C4, and C3 at equal intervals, and evaluator E3 values choices C2 and C3 equally, and further values C1 and C4 at equal intervals from choices C2 and C3. FIG. 9 shows numerical results that will be used to illustrate the application of the method of FIG. 5 to the valuations of FIG. 8.

When two or more choices are valued as substantially equal by a given evaluator, it is desirable to ensure that the score determined by the DMS for those choices are also equal. The condition of substantial equality may be determined in a number of ways, including use of a predetermined threshold (which might vary from evaluator to evaluator). Alternatively, the condition of substantial equality may be based on a distribution of interval sizes so that intervals with sizes that are (say) two standard deviations or more below the mean interval size are considered insignificant. The distribution may be determined from a one or more runs of the evaluator, or may be based on multiple runs from multiple comparable evaluators. Yet another approach to determining substantial equality may be based on absolute or relative differences in valuation, so that differences that are less than (say) 0.5% of the valuation range may be considered insignificant.

Figure 9A:
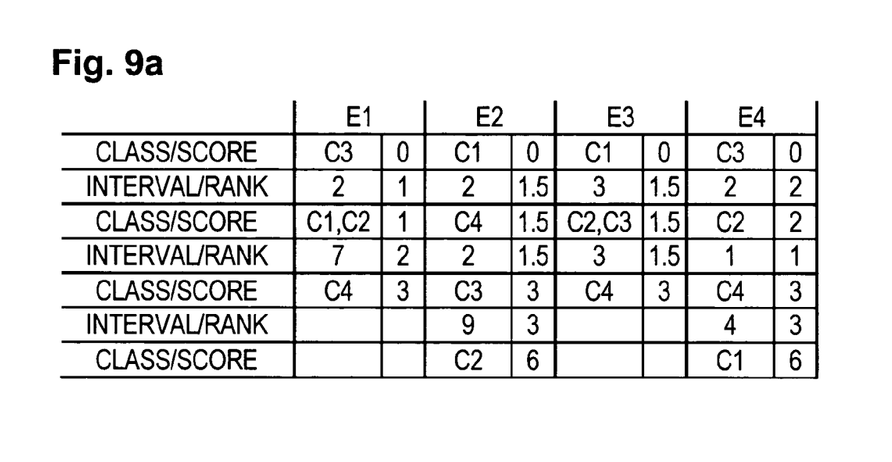
FIG. 9 is a table for applying the illustrative decision making method to the special case example in accordance with certain embodiments of the present invention.

In one embodiment, the DMS employs equivalence classes to ensure that the choices that an evaluator views as substantially equivalent are scored equally. Thus, for example, FIG. 9a shows that choices C1 and C2 are members of the same equivalence class for evaluator E1.

The equivalence class may be given a valuation based on the valuation of the choices that are member of that equivalence class. The equivalence class valuation may be determined using any statistical averaging mechanism, including, but not limited to, the arithmetic mean, the geometric mean, the harmonic mean, or the root mean square; the median, the maximum, the minimum, or the value at another specified ordinal position; or the mode, perhaps determined after rounding the valuations to some predetermined precision. The averaging may take place over all of the valuations or after some valuations have been discarded as "outliers" or redundancies. (For the example shown, these all turn out to be the same, but had there been a range of values considered "substantially equivalent" the results might well have differed.)

Once valuations have been determined for each equivalence class, the valuations may then be used to determine scores in the same manner as described previously. The score determined for each equivalence class may then be associated with each of the members of the equivalence class. Thus, once the score is determined for this equivalence class (1), the score will be assigned to both choices C1 and C2.

Figure 9B:
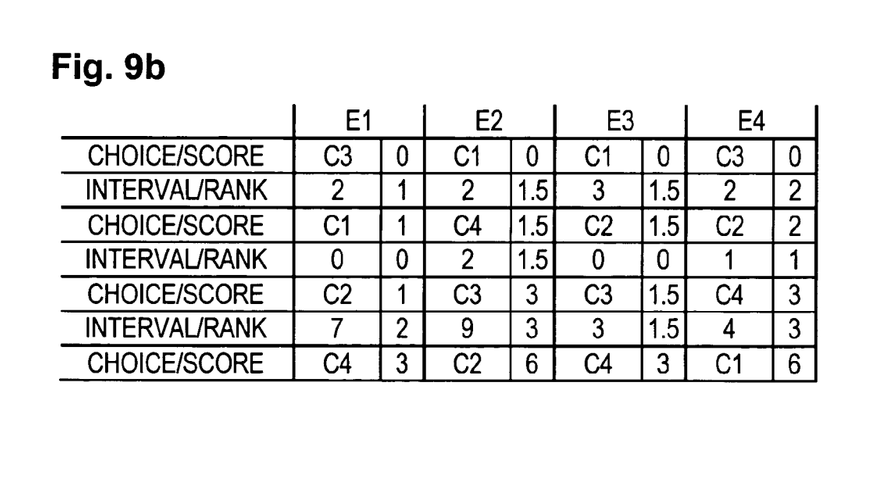

In an alternative embodiment, the equivalence classes may be dispensed with. Instead, the DMS may assign intervals of insignificant size a pseudo-rank of zero. See FIG. 9b, for example, which shows that the rank of the C1-C2 interval for evaluator E1 has been set to zero. The scoring function is then designed to provide an increment of zero when the interval rank is zero, thereby ensuring that equally valued choices are scored equally. Thus, for example, FIG. 9 shows an interval rank of zero for the C1-C2 interval determined for evaluator E1. The other intervals for evaluator E1 are the C3-C1 interval and the C2-C4 interval, which are respectively ranked 1 and 2. Note that the scores determined for choices C1 and C2 are equal.

When two or more intervals are substantially equal, it is desirable to ensure that the corresponding spacing in the scores is equal. As discussed previously with respect to valuations, substantial equality may be determined in a number of ways.

The DMS may ensure equal score spacing for substantially equal intervals in block 507 (FIG. 5) by assigning the intervals an equalized ranking. Thus, for example, FIGS. 9a and 9b show that for evaluator E2, the C1-C4 interval equals the C4-C3 interval, and that these intervals are the smallest two (non-zero) intervals. Accordingly, these intervals would have been assigned ranks 1 and 2 had they not been equal. Since they are equal, an equalized rank (in this case, the average of the ranks that would have been assigned, or 1.5) is assigned to each. The equalized rank values may be determined from the ranks that would have been assigned using any statistical averaging method, including, but not limited to, the statistical averaging methods provided above for use in calculating equivalence class valuations.

In an alternative embodiment, the equalized rankings are not necessarily equal. For example, in one embodiment, intervals that are not equal but are nevertheless substantially equal may be assigned equalized ranks that are adjusted slightly to reflect the slight inequality of the interval sizes. Thus three intervals that are substantially equal may be assigned equalized rank values that are respectively adjusted by −1%, 0, and +1% to reflect relative sizes of the intervals. This may aid in "tie-breaking" of the final scores.

The above discussion is only meant to be illustrative of the principles and various embodiments of the present invention. Numerous variations and modifications will become apparent to those skilled in the art once the above disclosure is fully appreciated. For example, the methods disclosed herein may be embodied as software on an information carrier medium that, when configured to provide the software to a computing device, enables the computing device to carry out one or more of the methods as disclosed. It is intended that the following claims be interpreted to embrace all such variations and modifications.

What is claimed is:

1. A processor-based method of combining valuations of multiple choices from each of multiple evaluators, the method comprising:
   for each evaluator,
      sorting the choices into an order that indicates preference;
      determining interval sizes between choice valuations;
      obtaining a rank for each interval size; and
      using interval size ranks, at least in part, to determine an evaluator score for each choice;
   combining evaluator scores for each choice to determine, at least in part, an overall score for each choice; and
   presenting to a user a list of choices ordered in accordance with the overall scores.

2. The method of claim 1, wherein said obtaining a rank for each interval size comprises ranking interval sizes from smallest to largest.

3. The method of claim 1, wherein said using interval size ranks to determine an evaluator score for each choice comprises:
associating a predetermined score with a first choice; and
iteratively calculating a score for each subsequent choice by combining the score of a preceding choice with an increment based on the rank of the interval size between the preceding choice and said subsequent choice.

4. The method of claim 1, further comprising:
determining equivalence classes for choices based on choice valuations, wherein said determining equivalence classes precedes said obtaining a rank for each interval size, and wherein said obtaining a rank for each interval size involves obtaining a rank for each interval size between valuations associated with different equivalence classes;
calculating scores for equivalence classes based on said interval size ranks; and
associating the score for each equivalence class with each choice that is a member of that equivalence class.

5. The method of claim 4, wherein said determining equivalence classes is based on a statistical interval distribution.

6. The method of claim 4, wherein said determining equivalence classes is based on a predetermined minimum interval size.

7. The method of claim 4, further comprising: generating a valuation to associate with each equivalence class by operating on the one or more valuations associated with the one or more choices in that equivalence class, said operating using an operator from a group consisting of:
an arithmetic mean of the one or more valuations;
a geometric mean of the one or more valuations;
a harmonic mean of the one or more valuations;
a root mean square of the one or more valuations;
a median of the one or more valuations;
a value corresponding to a predetermined percentile among the one or more valuations;
a most frequent valuation of the one or more valuations;
a most frequent valuation determined within a predetermined precision;
a maximum of the one or more valuations; and
a minimum of the one or more valuations.

8. The method of claim 1, further comprising:
assigning an adverse valuation to each choice not evaluated by a given evaluator, wherein the adverse valuation indicates that the choice is less preferred than the least preferred choice evaluated by the given evaluator, and wherein the adverse valuation separates the choice from the least preferred choice by an interval greater than each other interval between adjacent choice valuations.

9. The method of claim 1, wherein said ranking includes: assigning equalized ranks to intervals that are substantially equal.

10. The method of claim 1, wherein the overall score for each choice is a weighted or unweighted sum of evaluator scores for that choice.

11. The method of claim 1, wherein said combining includes:
scaling evaluator scores to a uniform range.

12. The method of claim 1, wherein said combining includes:
scaling evaluator scores to provide each evaluator with an equal sum of evaluator scores.

13. The method of claim 1, further comprising:
selecting a predetermined number of choices having the most favorable overall scores.

14. The method of claim 1, further comprising:
selecting from a group of choices a predetermined number of choices having the most favorable overall scores.

15. The method of claim 1, further comprising:
sorting the choices according to the overall score determined for each choice.

16. The method of claim 1, wherein at least one of the evaluators is selected from a group consisting of:
a provider of values derived from sensor measurements,
a provider of values derived from performance measurements,
a provider of values derived from solicited personal opinions,
a provider of values derived by a Bayesian network,
a provider of values derived by a decision tree,
a provider of values derived by an evolved algorithm,
a provider of values derived by a neural network,
a provider of values derived by a fitness estimator, and
a provider of values derived from complexity measurements.

17. The method of claim 1, wherein each choice represents an alternative from a group consisting of:
classifications of an item;
candidate solutions to a problem;
contest competitors; and
features to be used for classification.

18. A system for combining valuations of multiple choices from each of multiple evaluators, wherein the choices are different classifications and the valuations represent probabilities that a web site visitor belongs that classification, the system comprising:
a processor; and
a memory coupled to the processor and configured to provide the processor with software that configures the processor to iterate through the multiple evaluators, and for each evaluator configures the processor to:
obtain ranks of intervals between a valuation-ordered group of choices;
determine a score for each choice from the interval ranks;
combine choice scores for each evaluator to obtain an overall score for each choice; and
select the choice having the highest overall score as the classification for the web site visitor.

19. The system of claim 18, wherein the software further configures the processor to retrieve choice valuations from at least one external evaluator.

20. The system of claim 18, wherein the software further configures the processor to operate as at least one evaluator.

21. The system of claim 18, wherein the software further configures the processor to employ one or more of the choices in a manner responsive to the overall scores.

22. The system of claim 18, wherein as part of configuring the processor to rank intervals, the software configures the processor to assign a rank of zero to intervals of insignificant size.

23. The system of claim 18, wherein as part of configuring the processor to determine a score for each choice, the software configures the processor to:
determine equivalence classes for choices based on choice valuations before obtaining ranks of intervals, wherein said obtaining comprises finding ranks of the intervals between valuations associated with the equivalence classes;

calculate scores for equivalence classes based on the interval ranks; and associate the score for each equivalence class with each choice that is a member of that equivalence class.

24. The system of claim 18, wherein the software further configures the processor to assign an adverse valuation to each of an evaluator's unevaluated choices, wherein the adverse valuation indicates that the choice is less preferred than the least preferred choice evaluated by that evaluator, and wherein the interval between the least preferred choice and the unevaluated choice no smaller than each interval between that evaluator's evaluated choices.

25. The system of claim 18, wherein as part of configuring the processor to rank intervals, the software configures the processor to assign equalized ranks to intervals that are substantially equal.

26. The system of claim 18, wherein as part of configuring the processor to combine choice scores, the software configures the processor to scale choice scores to a uniform range.

27. The system of claim 18, wherein as part of configuring the processor to combine choice scores, the software configures the processor to scale choice scores to provide each evaluator with an equal sum of choice scores.

28. The system of claim 18, wherein the overall scores for each choice are weighted or unweighted sums of the scores for each choice.

29. An evaluation system for ranking a company's products comprising:

a means for determining a valuation by each of multiple evaluators for each of multiple products, wherein at least one evaluator determines a valuation representing revenue, and another evaluator determines a valuation representing profit;

a means for ranking intervals between valuation-ordered products for each evaluator;

a means for determining product scores using interval ranks for each evaluator;

a means for combining product scores to determine an overall score for each product; and a means for selecting a predetermined number of products in accordance with their overall scores.

30. The system of claim 29, wherein said means for determining product scores comprises:

a means for associating a predetermined score with a first product; and a means for iteratively calculating a score for each subsequent product by combining the score of a preceding product with an increment based on the rank of the interval size between the preceding product and said subsequent product.

* * * * *